US012786548B2

(12) United States Patent
Unger

(10) Patent No.: US 12,786,548 B2
(45) Date of Patent: Nov. 3, 2026

(54) INTELLIGENT VISUALIZATION AND AUTOMATION PLATFORM

(71) Applicant: OrthoPediatrics Corp., Warsaw, IN (US)

(72) Inventor: Kevin Unger, Sunbury, OH (US)

(73) Assignee: OrthoPediatrics Corp., Warsaw, IN (US)

( * ) Notice: Subject to any disclaimer, the term of this patent is extended or adjusted under 35 U.S.C. 154(b) by 0 days.

(21) Appl. No.: 18/441,495

(22) Filed: Feb. 14, 2024

(65) Prior Publication Data

US 2024/0414430 A1 Dec. 12, 2024

Related U.S. Application Data

(60) Provisional application No. 63/445,448, filed on Feb. 14, 2023.

(51) Int. Cl.
*H04N 23/62* (2023.01)
*H04N 23/54* (2023.01)
*H04N 23/66* (2023.01)

(52) U.S. Cl.
CPC ............. *H04N 23/62* (2023.01); *H04N 23/54* (2023.01); *H04N 23/66* (2023.01)

(58) Field of Classification Search
CPC ........ H04N 23/62; H04N 23/54; H04N 23/66; H04N 23/57; H04N 23/695
USPC ........................................................... 348/77
See application file for complete search history.

(56) References Cited

U.S. PATENT DOCUMENTS

| | | | |
|---|---|---|---|
| 5,499,293 A | 3/1996 | Behram et al. | |
| 8,498,883 B2 | 7/2013 | Lorsch | |
| 9,788,907 B1 | 10/2017 | Alvi et al. | |
| 10,226,302 B2 | 3/2019 | Lacal et al. | |
| 10,729,502 B1 * | 8/2020 | Wolf .............. | G06Q 10/063112 |
| 11,810,356 B2 | 11/2023 | Quist et al. | |
| 11,810,360 B2 | 11/2023 | Quist et al. | |
| 11,911,277 B2 | 2/2024 | Ratron | |
| 12,020,801 B2 | 6/2024 | Poltaretskyi et al. | |
| 12,046,349 B2 | 7/2024 | Morvan et al. | |
| 12,051,245 B2 | 7/2024 | Quist et al. | |
| 12,056,930 B2 | 8/2024 | Quist et al. | |

(Continued)

FOREIGN PATENT DOCUMENTS

| | | |
|---|---|---|
| EP | 3367387 | 8/2018 |
| WO | 2005072629 | 8/2005 |

(Continued)

*Primary Examiner* — Asmamaw G Tarko
(74) *Attorney, Agent, or Firm* — John V. Daniluck; Dentons Bingham Greenebaum LLP

(57) ABSTRACT

A system and method for visualizing, recording and processing medical image data seen from the vantage point of the surgeon's head or body during a surgical procedure for the purpose of automating certain processes based on visually detected events. The system utilizes a surgeon-mounted camera with image stabilization and tracking software to maintain a clear field of view of desired anatomy, equipment, implants, consumables, and various other objects that can be processed using artificial intelligence. Medical image data is transmitted wirelessly from the user to a computer and media management system for sharing, recording, processing, and data analytics to create the intelligent head camera system.

13 Claims, 2 Drawing Sheets shows a top view of the IHC system [100].

(56) References Cited

U.S. PATENT DOCUMENTS

| | | | | |
|---|---|---|---|---|
| 2004/0044295 | A1 | 3/2004 | Reinert et al. | |
| 2013/0188890 | A1* | 7/2013 | Naor | H04M 1/17<br>383/105 |
| 2014/0160248 | A1* | 6/2014 | Pomerantz | H04N 23/69<br>348/47 |
| 2015/0302157 | A1* | 10/2015 | Collar | A61B 50/10<br>382/128 |
| 2017/0202630 | A1* | 7/2017 | Gerstner | A61B 50/13 |
| 2019/0231433 | A1 | 8/2019 | Amanatullah | |
| 2020/0226481 | A1* | 7/2020 | Sim | G06F 21/34 |
| 2020/0237452 | A1* | 7/2020 | Wolf | G06F 3/048 |
| 2020/0273581 | A1* | 8/2020 | Wolf | G16H 40/63 |
| 2020/0285771 | A1* | 9/2020 | Dey | G06F 21/6272 |
| 2020/0334809 | A1* | 10/2020 | Vianu | G06V 30/333 |
| 2021/0128244 | A1 | 5/2021 | Couture et al. | |
| 2022/0020219 | A1 | 1/2022 | Chav et al. | |
| 2022/0226065 | A1* | 7/2022 | Hausen | A61B 90/361 |
| 2022/0406061 | A1 | 12/2022 | Quist et al. | |
| 2023/0232105 | A1* | 7/2023 | Hausen | G03B 17/561<br>348/207.99 |
| 2024/0197409 | A1 | 6/2024 | Couture et al. | |
| 2024/0377640 | A1* | 11/2024 | Asaban | G06T 19/006 |
| 2025/0331945 | A1* | 10/2025 | Gerstner | G16H 40/20 |

FOREIGN PATENT DOCUMENTS

| | | |
|---|---|---|
| WO | 2005084570 | 9/2005 |
| WO | 2024098058 | 5/2024 |
| WO | 2024100286 | 5/2024 |

* cited by examiner

Figure 1. Figure 1 shows a top view of the IHC system [100].
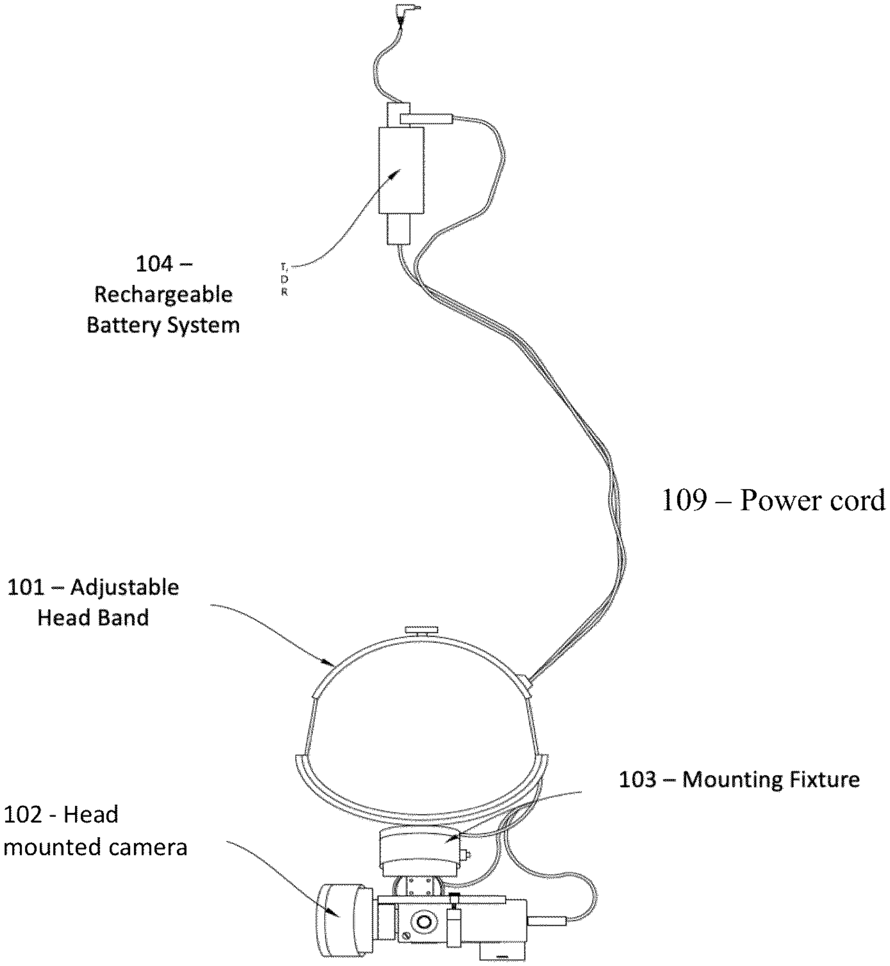
110 – Host computer with server database (HCSD)
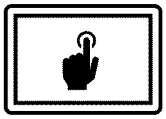
111 – Touchscreen with software User Interface

Figure 2. Figure 2 shows a side view of the IHC system [100].
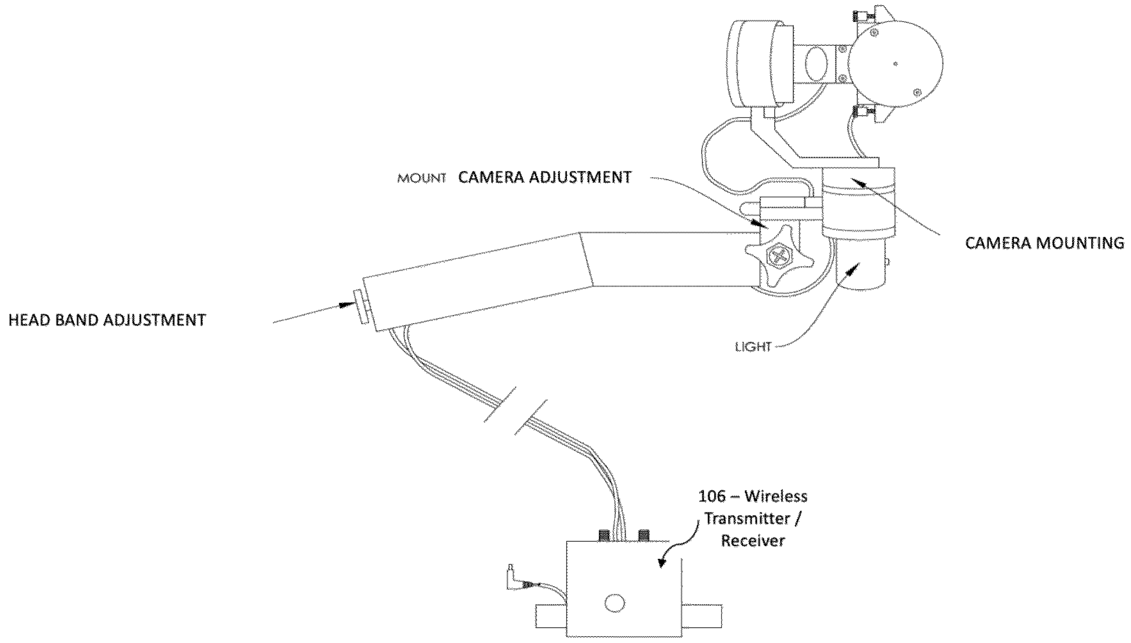
[0003] Figure 3. Figure 3 shows a front view of the IHC system [100].
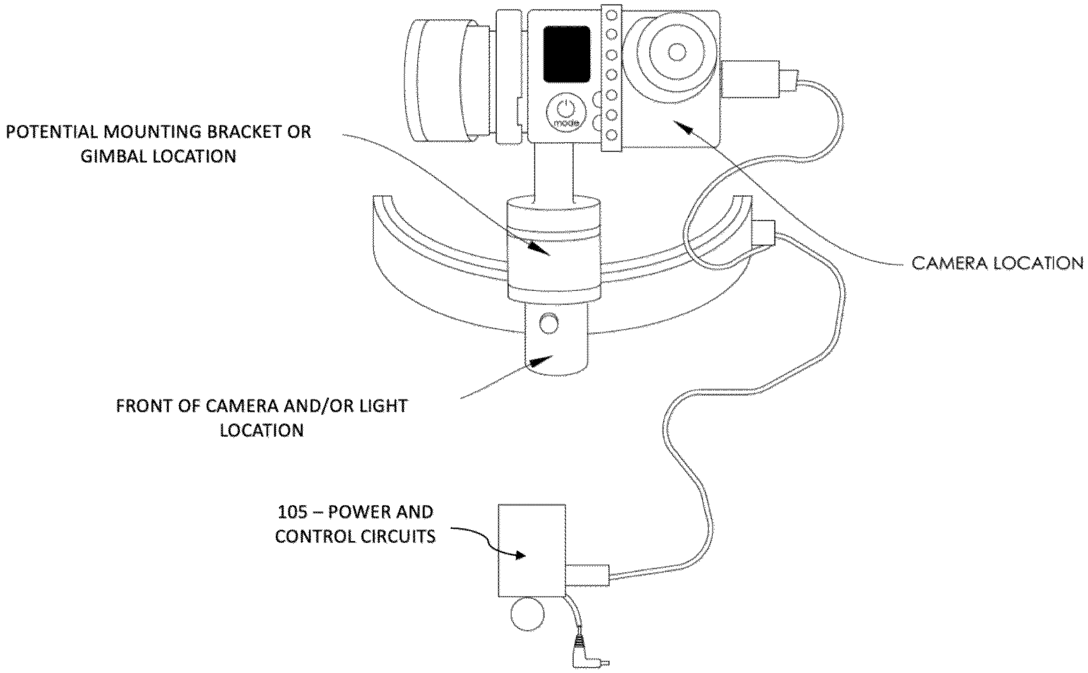

INTELLIGENT VISUALIZATION AND AUTOMATION PLATFORM

CROSS REFERENCE TO RELATED APPLICATION

This application claims the benefit of priority to U.S. Provisional Patent Application Ser. Nos. 63/445,448, filed Feb. 14, 2023, and incorporated herein by reference.

BACKGROUND OF THE INVENTION

The current market for capturing video footage of a surgical procedure from an overhead view consists of a few options. First, is an in-light camera that is mounted to the center of a surgical light suspended overhead. This camera angle offers an overhead view but frequently is obstructed by the surgeon or nurses head. Second option is a pendant mounted camera, similar in shape and function to the in-light camera and presenting the same problems. Both options one and two require infrastructure to suspend the camera from the ceiling. The third option is a large head-mounted camera where by the camera is fixed to the head mounting system and the angle of view moves dynamically with the person moving their head. This presents a significant challenge as the surgeon wearing the headcam is constantly moving and looking in various directions, causing the camera view to become very unpredictable and often focused on the wrong target. Additionally, the current products only offer the ability to view from the vantage point of the head of the user and do not offer a means for processing the medical image data for artificial intelligence, edge computing, analytics and other real-time applications to automate key functions currently conducted manually.

The Intelligent Head Camera (IHC) offers a solution to the problems stated above by eliminating the need for expensive infrastructure to suspend the camera from the ceiling, while also eliminating the challenge of keeping your head steady to maintain a constant and accurate viewpoint. The IHC requires no installation, pendant, surgical light nor infrastructure to use. It utilizes a wireless transmitter and receiver [106] system to transmit near zero latency medical image data to an associate host computer with server database and matrix router. It utilizes stabilization and tracking software to maintain a fixed field of view on the desired aspects of the surgical field. This allows the camera to stay focused on critical anatomy and various other processes being conducted in order to allow for real-time processing of the medical image data to drive automation and create smart software applications. It incorporates artificial intelligence (AI) to create a smart device using visual detection to enhance operating room efficiency, identify key events and objects, improve communication among staff and act as a safety check for key quality concerns in the operating room. The IHC can visualize and recognize key anatomical structures and equipment utilized during a patient encounter to automate the documentation process by attaching time, date, procedure step, anatomy, equipment utilization, disposable utilization and various other markings to create metadata for analytics, rules engine data, data outputs to integrated third party systems such as EMR and PACS, and master commands by the associated software platform.

The market currently has cameras mounted to the head of the user. These systems simply view whatever the user is looking at and sends it as a video output to a monitor. The market currently has cameras mounted to the surgical light for view from the overhead vantage point. These systems require construction and cabling, and often are obstructed from viewing the critical parts of the patient encounter. The market needs a system that uses the medical image data captured by the camera to support AI processing, edge computing and automation to streamline care and automate critical steps in the patient encounter workflow. the can The market needs a lower cost solution, requiring limited construction for installation, wireless transmission at near zero latency, fixed field of view, yet offering a superior visualization of the surgical procedure from the vantage point of the surgeon performing the procedure.

The methods and systems in various embodiments described herein address one or more market needs. Various embodiments of the present invention provide novel and unobvious methods and apparatus for improved head-mounted camera systems.

BRIEF SUMMARY OF THE INVENTION

The systems and methods in various embodiments preferably comprise one or more of a head mounted camera, rechargeable battery, miniature processor, wireless video transmitter, adjustable head band, adjustable belt band, microphone, host computer with server database (HCSD) for AI processing, matrix router and associated cabling. The head mounted camera may be mounted to a head band portion of the system. The battery pack, processor, and wireless transmitter may be mounted to the belt band or the head band. The cabling can connect the head mounted portion of the system to the belt mounted portion of the system. The medical image data captured by the camera can be sent wirelessly to the HCSD for storage and processing through the associated rules engine to create master commands, automation steps and integration with third party software platforms.

In one embodiment the system can allow the user to set a targeted focal point to be tracked by the camera using a tracking and stabilizing processor to maintain a constant or near constant view. The user can set the focal point using a custom user interface application within the software platform held at the HCSD. The user may also control the setting of the focal point by using a series of voice commands to control the process. For example, when the surgeon is wearing the IHC during surgery, he/she is unable to touch the camera or software screen while scrubbed in for surgery. The HCSD can display the IHC view on the surgical monitor so the surgeon can visualize the view of the IHC. When the correct field of view is seen, he/she can give a voice command such as "Set field of view" and the HCSD with IHC application can establish and fix the desired field of view so that subsequent head movements can not change the view seen by the IHC. This process can also be controlled using the touch screen and software user interface hosted by the HCSD. For example, the user controlling the software can see the output from the IHC on the touch screen and establish the fixed field of view by viewing and interacting with the IHC application. The touch screen is preferably located in the operating room and may be a fixed touch screen or wireless tablet touch screen. The wireless tablet touch screen may be bagged to offer a sterile touch screen for the surgeon, nurse or scrub to user while operating in a sterile environment. Gesture technology may also be used to control the software application using a series of hand gestures to act as a virtual mouse for controlling the software held on the HCSD.

The system preferably can allowa the user to quickly change out the rechargeable battery from the belt or head band for hot-swapping during surgical procedures. The battery can power the wireless transmitter, gimbal (if required), camera, microphone and other powered equipment included in the system. The battery can have a recharging station to charge batteries that are not in use.

In one embodiment, a method preferably includes documenting the surgical procedure from the vantage point of the IHC, in which the video output of the IHC can be sent wirelessly to a media management system for recording video and still images during the procedure. The method allows the user to start and stop record, capture images and control certain functions of the media management system via voice control, hand gestures, sterile mouse control and/or interaction with the software user interface.

In another embodiment, there is a method that preferably includes using the IHC can to capture medical image data of specific workflow steps and/or procedure specific steps for processing by the associated HCSD. The medical image data being captured by the IHC can be sent wirelessly or by wired signal to the HCSD in which the data can be used for advanced processing by the rules engine to create AI generated commands and activities to streamline data collection and software utilization. The automation enhancements can may be triggered based on object, equipment, anatomy and facial recognition seen by the IHC; in association with other data provided by third party applications and processed by the HCSD.

In another embodiment, there is a method that preferably includes using the IHCto capture medical image data of specific workflow steps and/or procedure specific steps for processing by the associated HCSD. The video being viewed by the IHC can be sent wirelessly or by wired signal to the HCSD in which the data collected can can be processed to support automated processes and/or documentation. The communication can may be triggered based on object, equipment, anatomy and facial recognition seen by the IHC; in association with other data provided by third party applications and processed by the HCSD.

In another embodiment, there is a method that preferably includes using the IHCto capture medical image data of surgical anatomy and/or procedure specific steps for processing by the associated HCSD. The medical image data being captured by the IHC can be sent wirelessly or by wired signal to the HCSD in which the data collected can be processed to support automated processes and/or documentation enhancements within the operating room. The enhancements can be triggered based on object, equipment, surgical anatomy and instrumentation recognition seen by the IHC.

In another embodiment, there is a method that preferably includes using the IHCto capture medical image data showing instrumentation, disposable use, consumable, implants and other various equipment utilized during a patient encounter for processing by the associated HCSD. The medical image data being visualized by the IHC can be sent wirelessly or by wired signal to the HCSD in which the data collected can be processed to support automated equipment utilization, inventory management and billing within the patient encounter location. The functionality can be triggered based on AI recognition software and processing of medical image data seen by the IHC.

The methods described herein may also apply to other camera systems utilized in the operating room, including applications of 360 camera systems, or various other mounting applications used to capture medical image data during a patient encounter. For example, the system described above may use a similar 360 Camera with associated HCSD and visual detection software to process similar medical image data captured from the vantage point of the bottom of a surgical light drop-tube or ceiling mounted application. The system may also utilize the camera array found in an image guided surgery device currently used for registration and recognition of detailed anatomy and instrumentation. The device may function as a source of visualization for further processing by the proprietary visual detection software. The visual detection software, rules engine, master commands, touch screen control and voice control applications can be applied to create automated documentation, communications, configurations, integration and other process-oriented functionality.

In another embodiment, there is a method that preferably includes setting the tracking parameters and field of view of the IHC from the sterile field using voice commands, hand gestures and/or sterile mouse control. When the user activates the process of establishing the tracking parameters, an outline of the parameter settings can be overlaid on the display, allowing the user to change, adjust, move and set the location by using voice commands, hand gestures and or sterile mouse control.

In another embodiment, there is a method that preferably includes setting the tracking parameters and field of view of the IHC from the software user interface. When the user activates the process of establishing the tracking parameters, an outline of the parameter settings can be overlaid on the touchscreen display, allowing the user to change, adjust, move and set the location.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

FIG. 1. shows a top view of a surgical visual recording system [100] according to one embodiment of the present invention.

FIG. 2. shows a side view of the system [100] of FIG. 1.

FIG. 3. shows a front view of the system [100] of FIG. 1.

DETAILED DESCRIPTION AND BEST MODE OF IMPLEMENTATION

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention.

It is understood that any reference to "the invention" is a reference to an embodiment of a family of inventions, with no single embodiment including an apparatus, process, or composition that should be included in all embodiments, unless otherwise explicitly stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims. The usage of words indicating preference, such as "preferably," refers to features and aspects that are present in at least one embodiment, but which are optional for some embodiments.

FIGS. 1-3 illustrate an IHC surgical photographic [100] in accordance with various embodiments of the present disclosure. The system [100] can include an adjustable headband [101] for fitting to a head of a user. The system [100] can also include a head mounted camera assembly [102] and camera mounting fixture [103] configured to adjust camera orientation and angle of view automatically based on a predetermined focal point or by manual adjustment using a user interface. The system [100] can also include a rechargeable battery system [104] for providing electrical power to a head mounted camera assembly [102] and mounting fixture [103]. The IHC includes a wireless transmitter transceiver [106] for communication with a HCSD [110] and touch screen user interface [111].

The headband [101], in accordance with various embodiments, can be constructed of any suitable material including, for example, plastics such as nylon 6, textiles such as medical grade elastic sweat bands, leather, polyamide film, or combinations thereof. In accordance with various embodiments, as shown in FIGS. 1-3, the headband [101] can be adjustable for providing a proper fit to a head of the user. Additionally, the headband [101], in accordance with various embodiments, can be soft enough to provide comfort to the user while providing sufficient strength and stiffness to retain and support the head mounted camera and mounting assembly [102]/[103], and battery assembly [104], and any other components (e.g., circuits, power source, cabling, transmitters) of the IHC [100]. Additionally, in accordance with various embodiments, one or more ergonomic elements (not shown) such as pads, covers, molded elements, or cushions can be provided along an interior surface of the headband [101] or covering the headband [101] to provide additional comfort to the head of the user.

It is further understand that yet further embodiments of the present invention contemplate a more rigid means for supporting the system on the head of the user, including a head-coupling device having a rigid or semi-rigid skeletal structure (such as using metal or plastic) combined with one or more straps or the like for tight attachment to the user's head. Still further, various embodiments include alternative means for supporting the system, including the use of a waist band, shoulder band, back pack, or the like for supporting components other than the optical path of the camera. Further yet, other embodiments include support of the camera from the chest or shoulders of the user. It is believed that supporting the camera from the chest or shoulders may result in less total movement of the camera as compared to supporting the camera from the head.

The power and control circuits [105] can be included in any suitable circuit or processor for powering and controlling the head mounted camera and mounting assembly [102]/[103]. For example, in accordance with various embodiments, the motor control circuits [105] can be included in one or more of a printed circuit board, a microprocessor, a microcontroller, a microprocessor, any other suitable electronic circuit, or combinations thereof. Preferably, the power and control circuits are supported on the body of the surgeon and connected to the camera by one or more wires.

The HCSD [110] and touch screen user interface [111], in accordance with various embodiments, can be included in one or more of a smartphone, a smart device, a tablet, touchscreen, a microprocessor, a microcontroller, laptop or any other device suitable for allowing the user to interface with the IHC camera. In some embodiments, the HCSD [110] and touch screen user interface [111] are used to configure the orientation of the camera to provide a fixed focal point for the camera and stabilization instructions to eliminate movement during the surgical procedure. The HCSD [110] and touch screen user interface [111] can be used to configure settings for operation of the system [100] from the HCSD [110] using wireless transmission of data and video. In some embodiments, the HCSD [110] is configured to transmit operational status data such as, for example, a position or orientation of the head mounted camera and mounting assembly [102]/[103].

The rechargeable battery system [104], in accordance with various embodiments can include, for example, one or more batteries such as alkaline, nickel metal hydride (NiMH), nickel cadmium (NiCad), lithium ion (Li-ion), lithium polymer (Li—Po), primary batteries, secondary batteries, a battery pack, an AC power source, an AC/DC adapter, or combinations thereof. In some embodiments, the rechargeable battery system [104] can deliver power to the system [100] via a power cord [109]. For example, in FIG. 1 the rechargeable battery system [104] is depicted as a belt-mountable battery pack connected to the system [100] via power cord [109]. However, it can be apparent in view of this disclosure that, in some embodiments, the rechargeable battery system [104] can be mounted directly to the headband [101] or in any other suitable location for delivering power to the IHC [100]. As one example, various embodiments contemplate the battery system being attached to a waist band, shoulder band, back pack, chest straps, or the like.

It can be apparent in view of this disclosure that, in accordance with various embodiments, additional components can be added to the IHC [100]. For example, in some embodiments, one or more gimbal mounting, and control units can be mounted to the head mounted camera [102] (or similar camera). The gimbal mounting in some embodiment preferably permits aiming of the camera lens along at least two axes, such as pitch and yaw. This gimbal orientation can be manually controlled by a person, electronically controlled by control software or by a user for those embodiments including motor drives for the aiming axes, or a combination of both.

In some embodiments, the system [100] can further include one or more audio sensors. The one or more audio sensors can be used, for example, to activate a series of control voice commands for setting, adjusting, manipulating, and recording live video footage taken during a surgical procedure.

The HCSD [110] and touch screen user interface [111] of the IHC [100], in accordance with various embodiments, communicate electronically via any suitable method including, for example, near field communication (NFC), Bluetooth, wifi, cellular networks, any other suitable wireless communications, or combinations thereof.

In some embodiments, a voice command platform can offer the user the ability to control, focus, establish focal points and/or adjust settings of the IHC [100]. Voice commands can include any suitable command such as, for example, "set focal point" to establish a fixed field of view or various other commands to activate specific functions. Such alternative control methods can, in some embodiments, advantageously reduce the number of separate hardware components that the user requires to operate the IHC [100]. Additionally, such alternative control methods can advantageously obviate the need for the user to operate the system [100] with the user's hands. For example, when the surgeon is wearing the IHC during surgery, he/she is unable to touch the camera or software screen while scrubbed in for surgery. When the surgeon desires to take a picture, he/she can give a voice command such as "Take picture" and the HCSD can send a message to the media management system to take a picture of the video being seen by the IHC. This process can also be controlled using the touch screen and software user interface hosted by the HCSD. For example, the user controlling the software can see the output from the IHC on the touch screen and take a picture of the IHC view by interacting media management system application and selecting the "image capture" button. The touch screen is located in the operating room and may be a fixed touch screen or wireless tablet touch screen. The wireless tablet touch screen may be bagged to offer a sterile touch screen for the surgeon, nurse or scrub to user while operating in a sterile environment. Gesture technology may also be used to control the software application using a series of hand gestures to act as a virtual mouse for controlling the software held on the HCSD.

Yet other embodiments include remote controlling of the camera by a person preferably not present near the surgical patient. This camera operator can see the camera image on a screen (such as via a Bluetooth data link), and manipulate the direction of the camera to a predetermined location (such as the location of a particular portion of patient anatomy).

In yet other embodiments, the direction of the camera can be automatically controlled to one or more aiming points established on the patient anatomy or established on locations proximate to the patient. For example, the surgical team can place predetermined symbols on the patient, the image of these symbols being preprogrammed into the camera control system. The control system then processes the video image to recognize the predetermined symbol and adjusts the camera orientation and field of view to place the symbol in a particular location in the image.

As one nonlimiting example, a symbol such as an "X" could be placed proximate to a surgical site. For an operation involving the patient's back, an "X" could be placed near a left shoulder and another symbol (such as a circle) be placed near the patient's right side waist. The control software locates each of these symbols, and adjusts the camera orientation to place them in predetermined locations within the video image, such as on the right or left of the image to accommodate a surgeon that will likely operate to a side of the patient. In some embodiments, the symbols are preferably placed such that a line drawn between the symbols intersects the surgical site of interest. The video data can be processed to identify the surgical site (the target) in the centralized location of the image. The camera can be electronically re-aimed (either automatically or by a user observing the image on a screen) after movement of the user wearing the camera. In still further embodiments, the field of view of the camera can be electronically adjusted, such enlarged to place both the symbols and surgical site in the image, or narrowed show only the surgical site.

Various embodiments contemplate that these symbols can be drawn on the patient with markers, or the symbols can be located on an adhesive backing and placed on the patient. In still further embodiments these symbols can be placed on, or otherwise be a part of, equipment proximate to the patient, such as locating symbols placed on the bed supporting the patient.

In some embodiments, a HCSD [110] and touch screen user interface [111] are used for processing medical image data and video collected by the IHC [100]. The HCSD [110] and touch screen user interface [111] can receive medical image data and video collected by the IHC [100], process the video through a rules engine and database capable of recognizing specific objects, equipment, workflow steps and anatomical structures. The system and methods for processing the medical image data and video from the system [100] are used to generate automated processes and software commands. For example, as the procedure progresses, the IHC may recognize a series of steps in the procedure to provide update messages letting the staff know how the procedure is progressing and compare to allocated time slots. These messages may be sent via email, text, instant messaging or other communication type, and may be sent to staff members associated with the patient encounter or workflow for a given patient encounter.

In some embodiments, a HCSD [110] and touch screen user interface [111] are used for processing medical image data and video collected by the IHC [100]. The HCSD [110] and touch screen user interface [111] can receive medical image data and video collected by the IHC [100], process the video through a rules engine and database capable of recognizing specific objects, equipment, devices, instrumentation, implants, consumables, and anatomical structures. The system and methods for processing the medical image data and video from the system [100] are used to curate video collected from the system [100] to segment video based on surgical phase detection associated with specific visually detected events, objects, equipment and anatomy throughout the surgical procedure. The curated video segments can be used for video based assessment purposes, surgical performance and further data analytics to drive best practices in surgical care. The curated video segments can be compared to a proprietary community of users to provide data analytics and comparative analysis for connecting experts to novices based on a proprietary AI algorithm used to evaluate surgical performance based on visual content collected from the IHC and processed through an associated intelligent media management system. The curated video segments can be used to support clinical trials and further product development through an interactive feedback loop using surgical phase and equipment specific video based assessments and data analytics.

In some embodiments, a HCSD [110] and touch screen user interface [111] are used for processing medical image data and video collected by the system [100] through a rules engine and database capable of recognizing specific objects, equipment, devices, instrumentation, implants, consumables, and anatomical structures. The system and methods for processing the medical image data and video from the system [100] are used to automate certain documentation steps for bookmarking, annotating and archiving in conjunction with the media management system. For example, when the IHC visualizes the specific surgical instrument used for making the femoral cut during a Total Knee Replacement procedure, the HCSD uses visual detection to recognize this specific instrumentation in association with other relevant data such as surgical procedure type to create automated meta data within the media management system. The HCSD can tell the media management system to start recording or take a picture of specific steps of the procedure and add documentation data such as time stamp, bookmark and/or annotate text for a given step in the procedure. The purpose of this method and process being to create concise clips of video that are automatically bookmarked and annotated for easy retrieving later. It can also allow for data analytics of specific steps in the procedure to support risk analysis, training and outcomes analytics. For example, the Chief of Surgery could look for outliers and see that Dr. Smith is taking twice as long to complete the Femoral Cut Step compared with all his colleagues and use this data to review previous surgeries, going to the exact frame in the video for each procedure documented using this method.

In some embodiments, a HCSD [110] and touch screen user interface [111] are used for processing medical image data and video collected by the system [100] through a rules engine and database capable of recognizing specific objects, equipment, devices, instrumentation, implants, consumables, and anatomical structures. The system and methods for processing the medical image data and video from the system [100] are used to automate certain quality checks, counts, billing processes and inventory management data. For example, the IHC can be used to visualize certain consumables and work in conjunction with the HCSD and associated visual detection software to identify consumable items, implants and other billable items to automate and quality check the billing process in the operating room. Billable items that are recognized by the IHC and associated visual detection software can be processed against the hospital generated pricing database to ensure accurate billing is accomplished and no billing opportunities are missed.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A method for video recording of a surgical procedure performed on a patient, comprising:

supporting a video camera from the body of a medical professional;

aiming the video camera at the surgical site;

acquiring video data of the surgical procedure commanding by voice the automatic stabilization of the video data during said acquiring;

wirelessly transmitting the acquired video data to a processor having a touch screen user interface; and re-aiming the video camera from the touch screen user interface.

2. The method of claim 1, wherein the graphical user interface is in a bag configured for operation in a sterile environment.

3. The method of claim 2, which further comprises comparing the workflow step data of electronically to a predetermined allocation of time slots and sending a message based on the comparison.

4. The method of claim 2, which further comprises placing a time stamp and a bookmark on a workflow step.

5. The method of claim 1, which further comprises recognizing anatomical structure from the acquired video data at the surgical site and storing data representing the recognized anatomical structure.

6. The method of claim 1, which further comprises recognizing equipment from the acquired video data used at the surgical site and storing data representing the recognized equipment.

7. The method of claim 1, which further comprises recognizing a workflow step from the acquired video data and storing data representing the workflow step.

8. The method of claim 1, which further comprises recognizing a billing process from the acquired video data and storing data representing the billing process.

9. The method of claim 1, wherein said supporting is from the head of the user with a semi-rigid skeletal structure.

10. The method of claim 1, wherein said supporting is by a gimbal mounting capable of moving along two axes.

11. The method of claim 1, which further comprises placing a predetermined symbol on the patients, and adjusting the orientation of the camera using the predetermined symbol.

12. The method of claim 1, which further comprises commanding by voice the setting of the focal point of the video data during said acquiring.

13. The method of claim 1, which further comprises commanding by voice the setting of the field of view of the video data during said acquiring.

* * * * *